(12) United States Patent
Dickey

(10) Patent No.: US 9,136,653 B2
(45) Date of Patent: Sep. 15, 2015

(54) ENCLOSED POWER OUTLET

(71) Applicant: JTech Solutions, Inc., San Ramon, CA (US)

(72) Inventor: J. Scott Dickey, San Ramon, CA (US)

(73) Assignee: JTECH SOLUTIONS, INC., San Ramon, CA (US)

( * ) Notice: Subject to any disclaimer, the term of this patent is extended or adjusted under 35 U.S.C. 154(b) by 0 days.

(21) Appl. No.: 14/295,165

(22) Filed: Jun. 3, 2014

(65) Prior Publication Data

US 2015/0108832 A1    Apr. 23, 2015

Related U.S. Application Data

(60) Provisional application No. 61/892,922, filed on Oct. 18, 2013.

(51) Int. Cl.

| | |
|---|---|
| H01H 35/00 | (2006.01) |
| H01R 24/22 | (2011.01) |
| H01R 35/02 | (2006.01) |
| H02H 11/00 | (2006.01) |
| H02J 9/00 | (2006.01) |
| H02G 11/00 | (2006.01) |
| H01R 103/00 | (2006.01) |
| H02G 3/08 | (2006.01) |

(52) U.S. Cl.
CPC .............. *H01R 24/22* (2013.01); *H01H 35/00* (2013.01); *H01R 35/02* (2013.01); *H02G 11/00* (2013.01); *H02H 11/00* (2013.01); *H02J 9/00* (2013.01); *H01R 2103/00* (2013.01); *H02G 3/088* (2013.01)

(58) Field of Classification Search
CPC ...................................... H01H 35/00
USPC ........................... 307/116, 326, 328
See application file for complete search history.

(56) References Cited

U.S. PATENT DOCUMENTS

| | | | | | |
|---|---|---|---|---|---|
| 3,433,886 | A | * | 3/1969 | Myers | 174/57 |
| 3,872,355 | A | * | 3/1975 | Klein et al. | 361/45 |
| 3,972,579 | A | * | 8/1976 | Kohaut | 439/131 |
| 4,551,577 | A | * | 11/1985 | Byrne | 174/57 |
| 4,658,577 | A | * | 4/1987 | Klein | 59/78.1 |

(Continued)

FOREIGN PATENT DOCUMENTS

| | | |
|---|---|---|
| CN | 2256603 Y | 6/1997 |
| CN | 202664713 U | 1/2013 |

(Continued)

OTHER PUBLICATIONS

International Search Report and Written Opinion for International Application PCT/US2014/040750, report completed Sep. 15, 2014, 11 Pgs.

*Primary Examiner* — Adi Amrany
(74) *Attorney, Agent, or Firm* — KPPB LLP

(57) ABSTRACT

Power outlets adapted for installation within an enclosure are provided. Power outlets are provided having a safety interlock adapted to prevent the creation of a hazardous condition within the enclosure as a result of the continued operation of an electrical device within the enclosed space. The safety interlock may include current limiting circuitry and hardware, hazard sensing devices interconnected with such current limiting circuitry and hardware or other circuit breaker switches, and combinations of such safety interlocks. The power outlets may also be adapted for installation within a movable enclosure, such as, for example, a drawer.

28 Claims, 11 Drawing Sheets

(56) References Cited

U.S. PATENT DOCUMENTS

| | | | | |
|---|---|---|---|---|
| 4,659,909 | A | * | 4/1987 | Knutson ............... 219/446.1 |
| 4,737,769 | A | * | 4/1988 | Masot ............... 340/533 |
| 4,901,060 | A | * | 2/1990 | Liu ............... 340/598 |
| 5,023,396 | A | * | 6/1991 | Bartee et al. ............... 174/486 |
| 5,318,453 | A | * | 6/1994 | Hwang ............... 439/131 |
| 5,508,568 | A | * | 4/1996 | Mammen ............... 307/117 |
| 5,625,345 | A | * | 4/1997 | Stark et al. ............... 340/628 |
| 5,742,464 | A | * | 4/1998 | Ceola et al. ............... 361/103 |
| 5,995,400 | A | * | 11/1999 | Park et al. ............... 363/146 |
| 6,028,267 | A | * | 2/2000 | Byrne ............... 174/59 |
| 6,049,143 | A | | 4/2000 | Simpson et al. |
| 6,086,390 | A | * | 7/2000 | Haut ............... 439/131 |
| 6,290,518 | B1 | * | 9/2001 | Byrne ............... 439/131 |
| 6,336,691 | B1 | * | 1/2002 | Maroney et al. ............... 312/236 |
| 6,380,852 | B1 | * | 4/2002 | Hartman et al. ............... 340/521 |
| 6,435,903 | B1 | * | 8/2002 | Nelson ............... 439/528 |
| 6,478,587 | B2 | * | 11/2002 | Sharples ............... 439/131 |
| 6,530,806 | B2 | * | 3/2003 | Nelson ............... 439/528 |
| 6,942,502 | B2 | * | 9/2005 | Sharples ............... 439/131 |
| 6,979,209 | B2 | * | 12/2005 | Griepentrog ............... 439/131 |
| 7,078,623 | B1 | * | 7/2006 | Sheehan ............... 174/665 |
| 7,154,402 | B2 | * | 12/2006 | Dayoub ............... 340/628 |
| 7,163,409 | B1 | * | 1/2007 | Chen et al. ............... 439/131 |
| 7,285,733 | B2 | * | 10/2007 | Bowman ............... 174/480 |
| 7,327,246 | B2 | * | 2/2008 | Schoor ............... 340/506 |
| 7,445,300 | B2 | | 11/2008 | Collins et al. |
| 7,505,237 | B2 | * | 3/2009 | Baxter ............... 361/42 |
| 7,575,467 | B2 | * | 8/2009 | Ferguson et al. ............... 439/489 |
| 7,626,120 | B1 | * | 12/2009 | Golden et al. ............... 174/53 |
| 7,736,178 | B2 | * | 6/2010 | Byrne ............... 439/574 |
| 7,837,483 | B2 | * | 11/2010 | Haut et al. ............... 439/131 |
| 7,934,932 | B1 | * | 5/2011 | Lee et al. ............... 439/31 |
| 7,967,616 | B1 | * | 6/2011 | Lee et al. ............... 439/131 |
| 7,978,447 | B2 | * | 7/2011 | Baxter ............... 361/42 |
| 7,999,419 | B2 | * | 8/2011 | Drane et al. ............... 307/326 |
| 8,000,074 | B2 | | 8/2011 | Jones et al. |
| 8,057,243 | B2 | * | 11/2011 | Lee et al. ............... 439/131 |
| 8,068,034 | B2 | * | 11/2011 | Shah et al. ............... 340/628 |
| 8,084,992 | B2 | * | 12/2011 | Scheffy et al. ............... 320/114 |
| 8,139,337 | B2 | * | 3/2012 | Baxter et al. ............... 361/103 |
| 8,238,070 | B2 | | 8/2012 | Kopelman |
| 8,277,233 | B2 | * | 10/2012 | Su ............... 439/131 |
| 8,348,683 | B2 | * | 1/2013 | Row ............... 439/131 |
| 8,450,879 | B2 | * | 5/2013 | Chilvers ............... 307/116 |
| 8,475,186 | B1 | * | 7/2013 | Sikkema et al. ............... 439/131 |
| 8,482,884 | B2 | * | 7/2013 | Hennessey, Jr. ............... 361/1 |
| 8,604,935 | B2 | * | 12/2013 | Shah et al. ............... 340/628 |
| 8,605,402 | B2 | * | 12/2013 | Ward et al. ............... 361/103 |
| 8,622,481 | B2 | * | 1/2014 | Niederriter et al. ............... 299/43 |
| 2002/0043978 | A1 | * | 4/2002 | McDonald ............... 324/508 |
| 2006/0006838 | A1 | * | 1/2006 | Clarke ............... 320/114 |
| 2006/0081390 | A1 | * | 4/2006 | Lange et al. ............... 174/50 |
| 2009/0142947 | A1 | * | 6/2009 | Byrne ............... 439/131 |
| 2009/0167537 | A1 | * | 7/2009 | Feliss et al. ............... 340/584 |
| 2009/0201145 | A1 | * | 8/2009 | Vasquez et al. ............... 340/539.1 |
| 2010/0033024 | A1 | | 2/2010 | Crucs |
| 2010/0073839 | A1 | | 3/2010 | Baxter et al. |
| 2010/0124849 | A1 | * | 5/2010 | Winstanley et al. ...... 439/620.21 |
| 2011/0117760 | A1 | * | 5/2011 | Winstanley et al. ............... 439/136 |
| 2011/0177703 | A1 | * | 7/2011 | Lin ............... 439/131 |
| 2012/0187746 | A1 | * | 7/2012 | Niederriter et al. ............... 299/42 |
| 2013/0048580 | A1 | * | 2/2013 | Bailey et al. ............... 211/13.1 |
| 2014/0077042 | A1 | * | 3/2014 | Niederriter et al. ............... 248/49 |

FOREIGN PATENT DOCUMENTS

| | | |
|---|---|---|
| CN | 202917882 U | 5/2013 |
| WO | 8700976 | 2/1987 |
| WO | 2007022490 A2 | 2/2007 |
| WO | 2007139918 A2 | 12/2007 |
| WO | 2008133798 A2 | 11/2008 |

\* cited by examiner

ENCLOSED POWER OUTLET

CROSS-REFERENCE TO RELATED APPLICATIONS

The current application claims priority to U.S. Provisional Patent Application No. 61/892,922, filed Oct. 18, 2013, the disclosure of which is fully incorporated herein.

FIELD OF THE INVENTION

The current invention is directed generally to enclosed power outlets; and more particularly to electrical power outlets that can be positioned within a structure, and that can in certain cases additionally allow for movement of the power outlet relative to the source of power.

BACKGROUND OF THE INVENTION

Electrical power outlets, and in particular alternating current (AC) power sockets are devices that allow electrically operated equipment to be connected to the primary alternating current power source in a building. Electrical outlets can differ in voltage and current rating, as well as in the shape, size and type of connector they are adapted for use with. The types used in each country are set by national standards, some of which are listed in the IEC technical report TR 60083, the disclosure of which is incorporated herein by reference. Plugs and socket-outlets for domestic and similar general use standardized in member countries of IEC.

Regardless, of the specific design and technical specification, a power outlet is typically formed of one or more sockets, which are fixed on a piece of equipment or a building structure and connected to an energized electrical circuit, and are adapted to cooperate with a movable connector attached to an electrically operated device. The sockets are designed to prevent exposure of bare energized contacts. To reduce the risk of failure or user misuse, power outlet systems often incorporate both physical safety features, such as, for example, recessed slots or holes, insulated sleeves, blocking shutters, orientation control; as well as electrical safety features, such as, for example, a protective earth connection to isolate a faulty appliance from the source.

Despite the advanced development of power outlets, a need still exists for electrical power outlets adapted specifically for installation within an enclosed structure, such as a cabinet or piece of furniture.

SUMMARY OF THE INVENTION

The current invention is directed generally to code compliant power outlet assemblies that can be placed within an enclosed structure.

In some embodiments, the invention is directed to a power outlet assembly for an enclosure including:
  at least one power outlet;
  at least one power source electrically interconnected to said at least one power outlet for providing a source of electrical energy to said power outlet; and
  at least one safety interlock having at least one sensor capable of detecting at least one hazardous condition within the environment of said enclosure, the at least one safety interlock being adapted to prevent the flow of electrical current between the at least one power source and the at least one power outlet upon detection of one or more of the at least one hazardous conditions.

In some other embodiments the at least one safety interlock is selected from the group consisting of a smoke detector, heat detector, and toxic gas monitor. In some such embodiments, the heat detector comprises a mechanical thermostat.

In still other embodiments the power outlet assembly includes at least two safety interlocks.

In yet other embodiments the power outlet assembly includes a current limiting safety interlock adapted to prevent the flow of current above a specified amperage from the power source to the power outlet.

In still yet other embodiments the power outlet assembly includes a transformer in electrical connection with the power source and adapted to convert the incoming electrical current from AC to DC.

In still yet other embodiments the power outlet assembly includes a transmitter in signal communication with the at least one safety interlock for communicating the status of the power outlet assembly to a user. In some such embodiments the transmitter is configured to automatically transmit upon activation of any one of the at least one safety interlocks.

In still yet other embodiments the power source is in a fixed position and the power outlet is movable relative to said power source.

In still yet other embodiments the power outlet assembly includes a flexible electrical interconnector in a conductive relation between the power source and power outlet, said flexible electrical interconnector adapted to provide continued electrical interconnection between the power source and power outlet without restricting the range of motion of the power outlet relative to the power source.

In still yet other embodiments the flexible electrical interconnector is adapted such that the bend radius of the flexible electrical interconnector is maintained above a specified minimum bend radius.

In still yet other embodiments the flexible electrical interconnector comprises an electrically conductive wire at least partially enclosed within a flexible conduit.

In still yet other embodiments the flexible electrical interconnector comprises a flexible chain conduit.

In still yet other embodiments the flexible electrical interconnector is bent in a single U-shape.

In still yet other embodiments the flexible electrical interconnector is bent into at least two U-shapes disposed in a parallel stacked configuration, the at least two U-shapes being interconnected with a pivotable connector.

In still yet other embodiments the wherein the enclosure is movable.

In still some other embodiments the invention is directed to a power equipped enclosure including:
  an enclosure defining an internal volume, said internal volume being accessible;
  at least one power outlet disposed within the internal volume of the enclosure;
  at least one power source electrically interconnected to said at least one power outlet for providing a source of electrical energy to said power outlet; and
  at least one safety interlock having at least one sensor disposed within the enclosure and capable of detecting at least one hazardous condition within the environment of said enclosure, the at least one safety interlock being adapted to prevent the flow of electrical current between the at least one power source and the at least one power outlet upon detection of one or more of the at least one hazardous condition.

In some other embodiments the at least one safety interlock is selected from the group consisting of a smoke detector, heat detector, and toxic gas monitor. In some such embodiments the heat detector comprises a mechanical thermostat.

In still other embodiments wherein the power outlet assembly comprises at least two safety interlocks.

In yet other embodiments the power equipped enclosure further includes a current limiting safety interlock adapted to prevent the flow of current above a specified amperage from the power source to the power outlet.

In still yet other embodiments the power equipped enclosure further includes comprising a transformer in electrical connection with the power source and adapted to convert the incoming electrical current from AC to DC.

In still yet other embodiments the power equipped enclosure further includes a transmitter in signal communication with the at least one safety interlock for communicating the status of the power outlet assembly to a user.

In still yet other embodiments the transmitter is configured to automatically transmit upon activation of any one of the at least one safety interlocks.

In still yet other embodiments the power equipped enclosure further includes at least one movable element, and wherein the power source and power outlet are arranged such that the movement of the at least one movable element moves the power outlet relative to the power source.

In still yet other embodiments the power equipped enclosure further includes a flexible electrical interconnector in a conductive relation between the power source and power outlet, said flexible electrical interconnector adapted to provide continued electrical interconnection between the power source and power outlet without restricting the range of motion of the power outlet relative to the power source.

In still yet other embodiments the flexible electrical interconnector is adapted such that the bend radius of the flexible electrical interconnector is maintained above a specified minimum bend radius.

In still yet other embodiments the flexible electrical interconnector comprises an electrically conductive wire at least partially enclosed within a flexible conduit.

In still yet other embodiments the flexible electrical interconnector comprises a flexible chain conduit.

In still yet other embodiments the flexible electrical interconnector is bent in a single U-shape.

In still yet other embodiments the flexible electrical interconnector is bent into at least two U-shapes disposed in a parallel stacked configuration, the at least two U-shapes being interconnected with a pivotable connector.

In still yet other embodiments the movable portion is a drawer.

In still yet other embodiments the power outlet is oriented vertically and is disposed in the side of the drawer.

In still yet other embodiments the power outlet is oriented horizontally and is disposed in the bottom of the drawer.

In still yet other embodiments the power equipped enclosure is movable.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims of the current invention will be more fully understood with reference to the following figures, which are presented as exemplary embodiments of the invention and should not be construed as a complete recitation of the scope of the invention, wherein:

DETAILED DESCRIPTION OF THE INVENTION

Figure 1A:
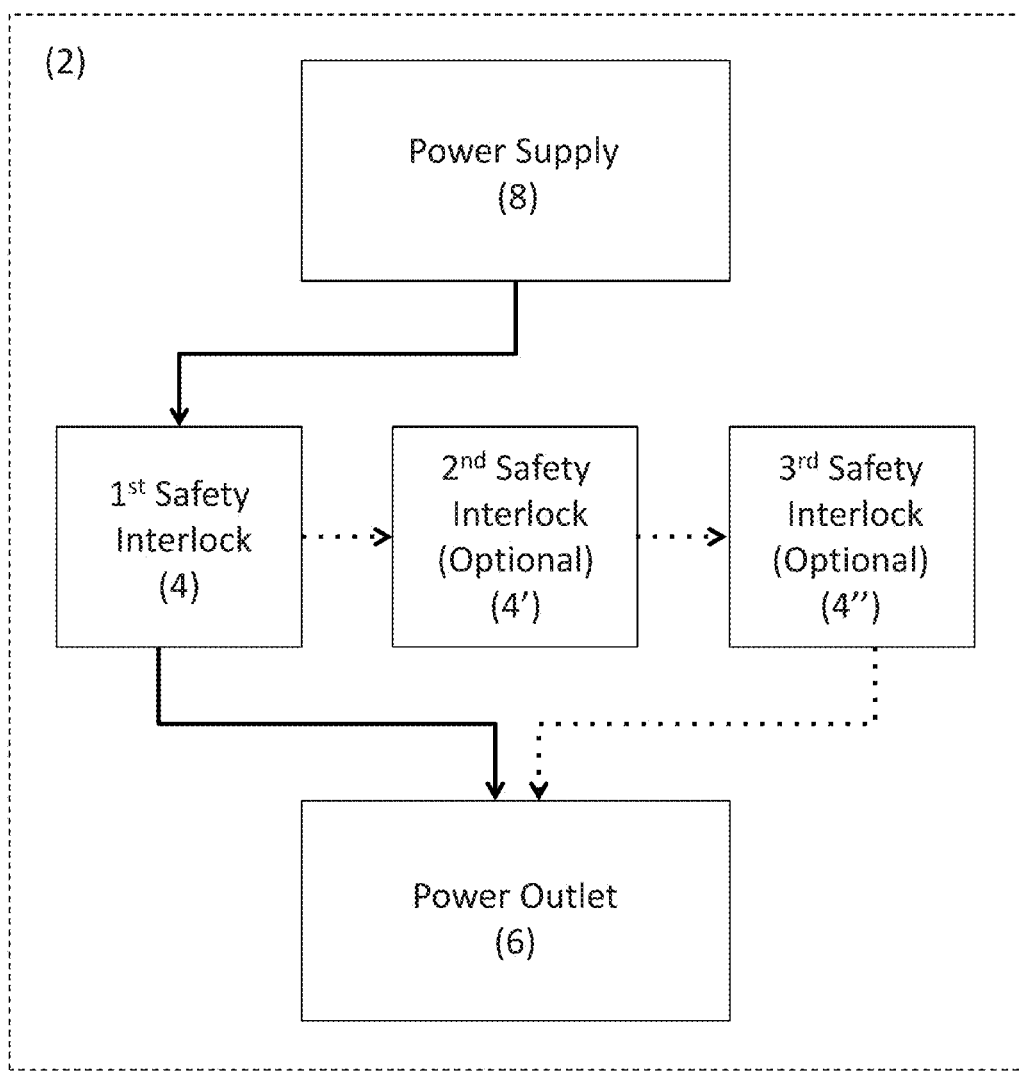
FIGS. 1a and 1b provide schematics of power outlet assembly layouts in accordance with many embodiments of the invention.

Turning to the figures and schematics, power outlets adapted for installation within an enclosure are provided. In many embodiments, outlets are provided having a safety interlock adapted to prevent the creation of a hazardous condition within the enclosure as a result of the continued operation of an electrical device within the enclosed space. In some embodiments, the safety interlock may include current limiting circuitry and hardware, hazard sensing devices interconnected with such current limiting circuitry and hardware or other circuit breaker switches, and combinations of such safety interlocks. In many embodiments the power outlet may be adapted for installation within a movable enclosure, such as, for example, a drawer. In some embodiments, the electrical interconnection between the power outlet and the source of power is flexible and has a length and geometry that allows for the consistent travel of the power outlet a specified distance away from the source of power. In many embodiments the power outlets may be adapted to provide a current suitable only for low amp requirements, such as, for example, for the charging of electronic devices. In other embodiments the power outlets may be adapted to provide a current suitable for standard electrical devices, such as, for example, electrical bathroom appliances like hairdryers, curling irons, heated curlers, etc.

It has long been realized that mounting power outlets within enclosures can create arrangements with a great deal of utility, for example, by providing interior lighting, temperature control, or simply power availability for charging or operating electrical devices within, for example, an enclosed cabinet, drawer, etc. Accordingly, many attempts have been made to integrate power outlets within a variety of enclosures, including, for example, drawers, storage chests and cabinets. (See, e.g., U.S. Pat. No. 8,084,992; PCT Pub. No.

WO2007139918; PCT Pub. No. 2007022490, and EP Pub. No. 2142040, the disclosures of each of which are incorporated herein by reference.) However, in designing these power integrated enclosures, structures and equipment, little thought has thus far been given to mitigating the inherent hazards created by this power equipment, particularly in the case of general purpose power outlets to which any electrical device or appliance, including unauthorized or non-recommended devices and appliances, may be connected, and which may thus give rise to unexpected hazards when powered-on or left unattended in a powered-on state within the enclosure. In particular, while many of these devices may include safety systems capable of detecting an electrical fault in the system, such as a ground or arc fault, or some other kind of short-circuit, none have considered methods and systems for detecting hazards that may be created within an enclosure from the proper operation of an electrical device/appliance.

This is problematic, as in accordance with regulations in most countries, including the United States, individuals may face liability for negligently creating a hazardous situation from an electrical installation that results in loss of life or property. To avoid such liability it is, therefore, important to follow a standard set of building and electrical code laws, such as those issued, for example, in the United States in the National Electrical Code (NEC), which is itself part of the National Fire Codes published by the National Fire Protection Association (NFPA). Electrical devices and appliances also have to be designed, manufactured, tested or inspected, and marked in accordance with requirements of an appropriate listing agency, such as, for example the Underwriters Laboratories (UL), MET Laboratories, Inc. (MET), Intertek Group (ETL), Canadian Standards Association (CSA), and FM Approvals (FM), among others. The absence of such approval means that general purpose power outlets for use and installation in enclosures, though promising for many applications, are not available for widespread use.

Accordingly, in many embodiments, power outlet assemblies are provided that include one or more safety interlocks adapted to prevent the creation of a hazard by the operation of electrical devices and appliances while interconnected with the power outlet within an enclosure. FIG. 1a provides a generalized schematic diagram showing the operational layout of power outlets in accordance with many embodiments. As shown, the power outlet assembly (2) generally comprises one or more safety interlocks (4, 4' and 4") in electrical interconnection between a power outlet (6) and the associated power source (8). As installed, at least the power outlet is installed within the subject enclosure, as well as those safety interlocks necessary to be included within the subject enclosure to detect a hazardous condition generated by the operation of the power outlet. Regardless of the number or type of safety interlocks included with the power outlet assembly, each could be arranged such that the triggering or activation of a single safety interlock would terminate current from the power source to the power outlet. Note, although three safety interlocks are shown in FIG. 1a, it will be understood that any number and arrangement of safety interlocks may be incorporated into the device such that one or more possible hazardous conditions associated with the use or misuse of the power outlet assembly may be prevented.

Figure 1B:
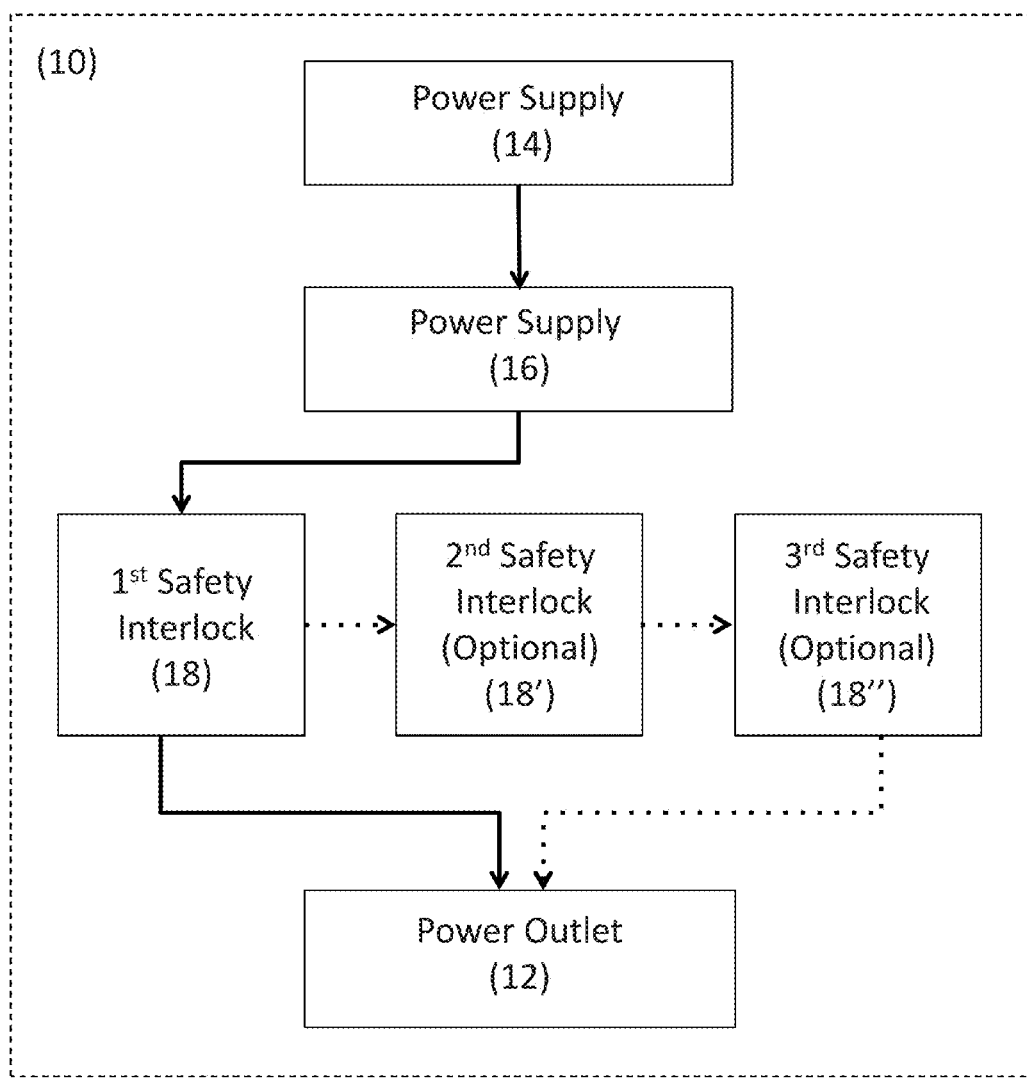

FIG. 1b provides alternative embodiments of power outlet assemblies (10) that incorporate a power outlet (12) that is movable relative to the power source (14). As shown, in such embodiments the assemblies also incorporate a flexible electrical interconnector (16) disposed between the incoming power source and the power outlet such that the power outlet may be moved in relation to the incoming power source without creating a disconnected between the power source and power outlet. Note although the flexible electrical interconnector (16) is shown as being disposed between the power source (14) and the one or more safety interlocks (18, 18' and 18") it will be understood that the flexible electrical interconnector may be disposed anywhere between the incoming power source and the power outlet such that the power outlet may be moved in relation to the incoming power source without creating a disconnected between the power source and power outlet.

While the above schematics describe a single power outlet, it will be understood that at any enclosure may incorporate any number of power outlets and/or power sources interconnected with any number of electrical interconnections and safety interlocks. Finally, while the above schematics show some generalized features of embodiments of power outlet assemblies, it will be understood that additional electrical and mechanical features and devices may be incorporated into the power outlet assemblies. For example, in embodiments the assembly may include a ground fault circuit interrupter (GFCI) such that the assembly may be used in wet locations, as defined in the NEC code, or it may incorporated an arc-fault circuit interrupter (AFCI) to prevent arcs from hot to neutral that can develop when insulation between wires becomes frayed or damaged. Likewise, the power outlet assembly may include dimmer circuits, illuminated outlet covers, wireless or wire remote control, transmitters, timer circuits, etc.

DEFINITIONS

Before proceeding to specific examples of possible power outlet assemblies, some general definitions are provided concerning the subject components.

A power source, for the purposes of embodiments, refers to any type of conduit, housing, wiring or hardware that brings any general-purpose alternating-current (AC) electric power source, such as, for example, household power, household electricity, house current, powerline, domestic power, wall power, line power, AC power, city power, street power, and grid power, into an enclosure. It will be understood that any voltages and frequencies may be used with the power outlet assembly embodiments dependent on the distribution regulations and rules set forth for a particular locale. For example, in one exemplary embodiment the power outlet power source would include a circuit capable of supplying a 120V/10 A maximum current, or alternatively 220V or 440V dependent on the requirements of any suitable electric power standard, such as, for example any of those published by the International Electrotechnical Commission (IEC) in the IEC Technical Report 60083, the substance of which is incorporated herein by reference. In addition, the power source may include suitable rectifying circuits for converting or rectifying the AC power from the external source of power into DC power with a standard AC to DC converter that is commonly used to power many devices. Any suitable DC current may be thus provided depending on the power requirements of the device to be powered by the power outlet.

A safety interlock, for the purposes of embodiments, refers to any device, circuit or sensor capable of detecting an unsafe condition or hazard generated by the operation of the enclosed power outlet. Embodiments of such safety interlocks may include mechanical or electromechanical devices adapted to prevent the flow of current through the power outlet, and thus into the electrical device or appliance when the operation of the electrical device or appliance is creating a hazard despite the fact that both the electrical circuit and the electrical device are operating within tolerances. Embodiments of such safety interlocks may include current limiting devices, such as circuit breakers and/or fuses adapted to detect short circuits between the live and neutral wires, or the drawing of more current than the power outlets is rated to handle to prevent overheating and fire. In still other embodiments such safety interlocks may include sensors adapted for detecting a hazardous condition in the environment of the enclosure (such as overheating, smoke, poisonous gas, etc.). Such sensors may incorporate integrated circuit interrupters, or may be interconnected to a circuit interrupter such as a circuit breaker or fuse such that upon detection of a hazardous condition current from the power source to the power outlet could be terminated. Finally, such safety interlocks may include position sensors or switches for activating the safety interlocks only when the enclosure within which the power outlet has been installed is in a configuration (such as a closed condition) in which the device interconnected to the power outlet would be concealed within the enclosure. The system may also include any combination of such safety interlocks.

A power outlet, for the purposes of embodiments, refers to any electrical socket for domestic, commercial and light industrial purposes generally provide any number or arrangement of electrical connections to the supply conductors. For example, the power outlet may include two pin sockets (providing, for example, neutral and line connections), three pin sockets (that provide, in addition, a protective earth connection), some sockets may have two line connections (such as a split phase system having 240 V between line connections each at 120 V with respect to earth ground), or a three-phase system (having, for example, 208 V between contacts and only 120V between each contact and earth ground). This power outlet could also be delivered in any combination of such receptacles, such as, for example, split between one or more standard two or three prong connections, or standard connections and specialized connectors including, USB, thunderbolt, firewire, etc. In addition, although the above discussion and figures show standard in-wall power outlets, it should be understood that embodiments of the invention are also directed to alternative power outlet designs including power strips and the like.

An electrical interconnector, for the purposes of embodiments, may mean any wire or cable having an appropriate current rating. It should be understood that no restrictions are placed on the exact construction or design of the electrical interconnectors used or how they are configured. For example, wire used as an electrical interconnector may be unprotected, or be installed within appropriate conduit or ducting to protect the wire from sharp metal edges of cut conduits or cabinet holes. In addition, such electrical interconnectors are not restricted solely to wired devices, methods and devices for the wireless transmission of electrical power and signals may also be incorporated within many embodiments.

A movable power outlet, for the purposes of embodiments, may mean a power outlet that is movable relative to the incoming power source for the enclosure. For embodiments where a movable power outlet is incorporated into the enclosure, the electrical interconnector may include at least one flexible or extendable portion that is adapted to provide a certain distance of travel between the movable power outlet and the power source and prevent wearing, tangling or other potential hazards to arise in the electrical interconnector, as will be described in greater detail below.

An enclosure, for the purposes of embodiments, may be any structure that defines an internal volume into which the power outlet and any electrical device or appliance interconnected therewith are at least partially enclosed or contained. The enclosure should have at least one opening into the internal volume such that the power outlet may be accessed, such opening may be fixed or may be sealable, such as by a door, drawer, hatch, etc. The enclosure may be fixed, such as a permanently attached cabinet, or may be movable, such as a movable tool chest or other piece of movable furniture, or the enclosure may be fixed or movable and incorporate movable elements into which the power outlet is installed, such as a drawer within a fixed or movable cabinet.

Although not described in the sections above, additional circuits and hardware could be provided to allow for additional functionality including, for example, other power and data connections, as well as interrupts or switches that would turn on or off the circuit based on the relative position of the outlet box to the junction box. In addition, other circuits might be incorporated for the measurement and reporting of power consumption for each receptacle, and either standard or user input thresholds or standards that can be compared against so that a user could be alerted to abnormal or undesirable power situations. In another example, the circuitry might include timing circuitry or light-sensing circuitry that could be used to independently control the power circuitry at the user's direction. It will be understood that these elements are not intended to be limiting, and extensions thereof, as well as other structures and devices capable of incorporation embodiments of power outlet assemblies, will be described below in association with the following exemplary embodiments.

Exemplary Embodiment

The person skilled in the art will recognize that additional embodiments according to the invention are contemplated as being within the scope of the foregoing generic disclosure, and no disclaimer is in any way intended by the following, non-limiting examples.

Power Outlet Assemblies for Enclosure Installation

As described above, one possible hazard that can arise when incorporating a general purpose power outlet into an enclosure, such as a cabinet is that a user may interconnect an electrical device or appliance that generates heat (such as a hair dryer, curler, etc. in a bathroom cabinet or drawer) and leave that device in operation, and unattended, within the enclosure thus creating a potential fire hazard. Accordingly, many embodiments of power outlet assemblies are configured with safety interlocks adapted to prevent electrical devices and appliances from creating a hazardous condition within an enclosure.

Current Limiting Safety Interlocks

In many embodiments such a safety interlock might include a current limiting device, such as a fuse or circuit breaker that would restrict the total current capable of passing through the power outlet assembly to a level suitable only for low amperage electrical device or appliances, such as for the charging of personal electronics, rechargeable batteries, flashlights, etc. In such embodiments, the power outlet assembly is adapted such that a hazard within the enclosure is incapable of being created.

Figure 2A:
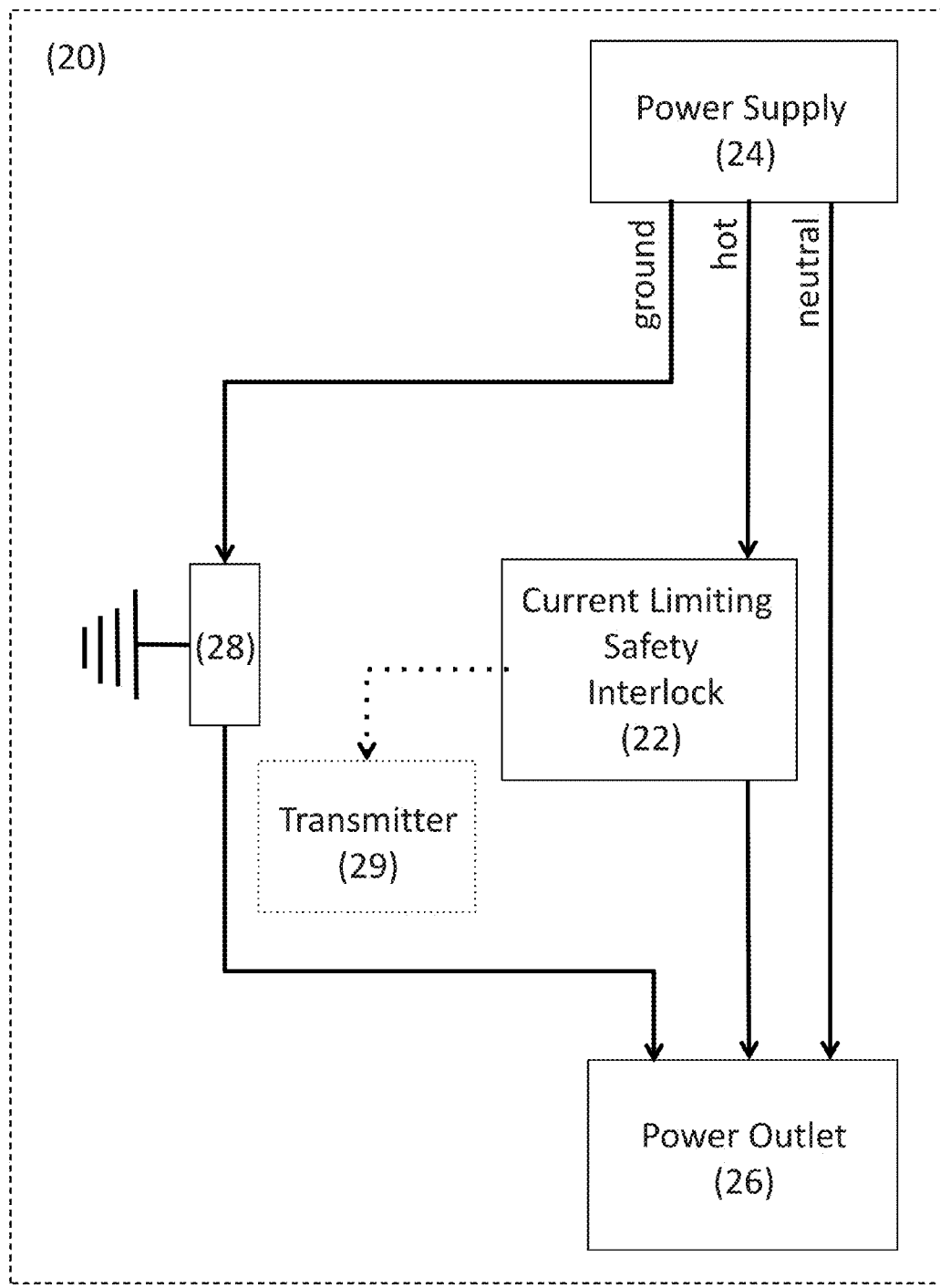
FIG. 2a provides a schematic of power outlet circuitry incorporating a current limiting safety interlock in accordance with many embodiments of the invention.

FIG. 2a provides a schematic wiring diagram in accordance with embodiments of such a current limiting power outlet assembly (20). As shown, in some such configurations a current limiting safety interlock (22), such as, for example, a circuit breaker and reset or a fuse, may be interconnected on the hot wire between the power source (24) and power outlet (26) to provide only sufficient power for low voltage and low current recharge of electronic devices. As shown, this safety interlock would be in addition to any standard ground (28). In such embodiments the circuit could be protected, for example, by a 3 A circuit breaker so that the whole circuit would be limited to 3 A or less, although any suitable current limiting circuit and current level could be implemented. In addition, as many low current applications require DC no AC power, the circuit could also include a suitable rectifier or transformer capable of conditioning the electrical output to suit the specific purpose.

As described above, such a current limiting safety interlock power outlet assembly may include any other suitable or desired circuitry or hardware for additional safety or functionality. In particular, the power outlet assembly may optionally include a transmitter (29) for communicating information about the power outlet usage, as well as the activation of the safety interlock to a user. Such a transmitter may be wireless or wired, and use any message and transmission format desired.

Hazard Sensing Safety Interlocks

Although current limiting the power outlet assembly, as proposed in the embodiments above, is one method of preventing the creation of a hazardous condition within the enclosure, in many embodiments it is necessary and desirable to maintain the power outlet as a general purpose outlet capable of operating a wide variety of electrical devices and appliances, including electrical devices and appliances that require high current (e.g., 15 A and above), including many common kitchen and bathroom appliances, such as, for example, hair dryers, hair curlers, electric toothbrushes, blenders, mixers, etc. Accordingly, in many embodiments power outlet assemblies are provided that incorporate a hazard sensor safety interlock, such that upon detection of a hazardous condition the power from the power source would be interrupted.

Figure 2B:
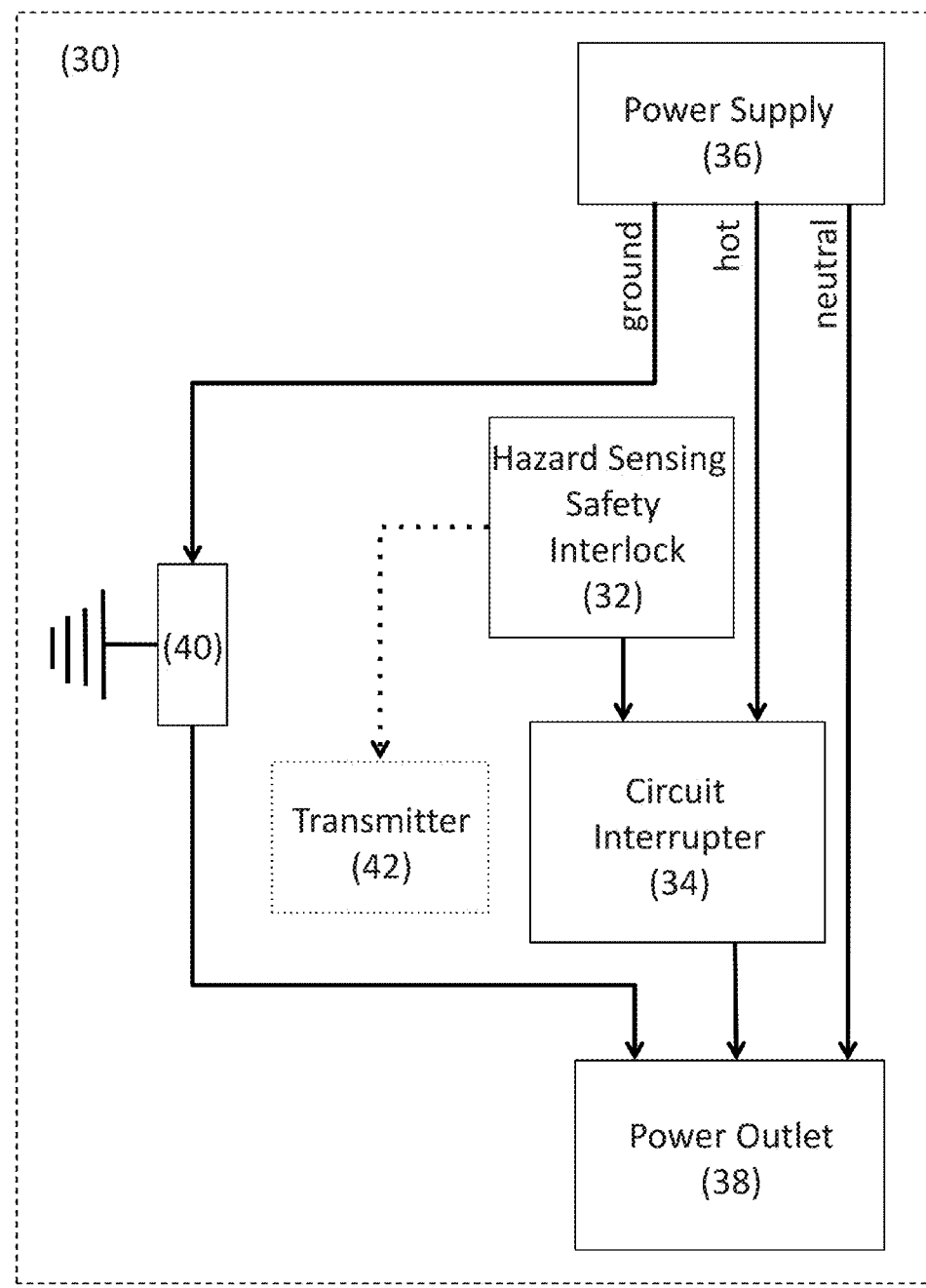
FIG. 2b provides a schematic of power outlet circuitry incorporating a hazard sensor safety interlock in accordance with many embodiments of the invention.

FIG. 2b provides a schematic wiring diagram in accordance with embodiments of such a hazard sensing power outlet assembly (30). As shown, in some such configurations a hazard sensing safety interlock (32) is placed in signal communication with a circuit interrupter (34), such as, for example, a circuit breaker, reset or a fuse, itself interconnected on the hot wire between the power source (36) and power outlet (38) such that on detection of a hazardous condition within the environment of the enclosure the circuit interrupter would be triggered thus preventing further power from flowing into the outlet. Although the schematic shows the safety interlock and circuit interrupter as separate devices, in embodiments the two could be combined into a single device. As above, this safety interlock would be in addition to any standard ground (40), or other standard circuit protective hardware or software.

Figure 3:
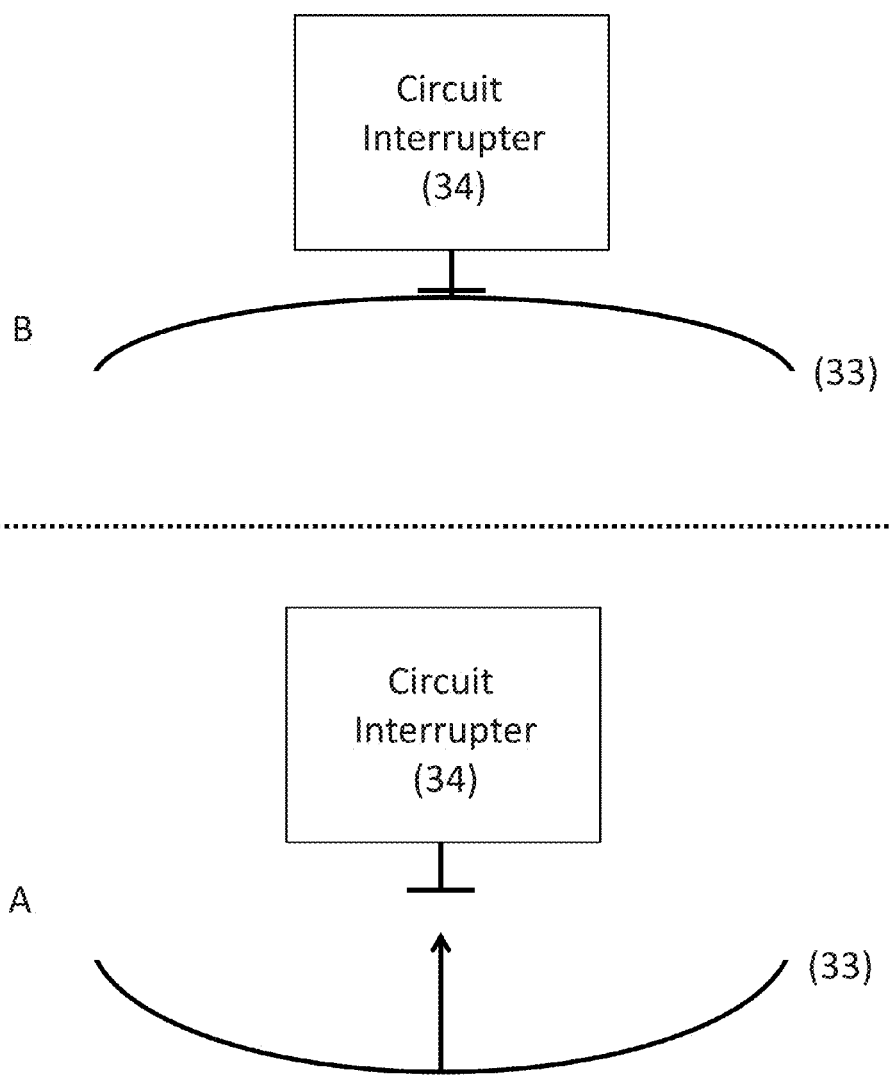
FIG. 3 provides a schematic of a heat sensor safety interlock in accordance with many embodiments of the invention.

Turning to the hazard sensing safety interlocks, while there are a number of well-known systems available for detecting and preventing a dangerous electrical condition, such as from a ground or arc fault, from occurring within an electrical circuit, these systems only address issues that arise from an electrical fault, either in the wiring of the outlet or in the operation of the electrical device/appliance attached thereto. However, as discussed above, where an outlet is to be installed within an enclosure, additional hazards can arise even where both electrical circuit and electrical device/appliance are operating satisfactorily. Accordingly, in embodiments a hazard sensor safety interlock is to be understood to refer to a sensor adapted to detect a potential hazardous condition created by the operation of an electrical appliance or device within the enclosure, such as overheating or fire, by monitoring the environment of the enclosure. In some exemplary embodiments the hazard sensor is one of either a smoke, toxic gas ($CO$, $CO_2$, e.g.) and/or heat sensor. In one exemplary embodiment the heat sensor is comprised of a resettable mechanical thermostat that activates when a specific threshold temperature is reached. A diagram of an exemplary embodiment of a suitable thermostatic heat sensor is shown schematically in FIG. 3. In this embodiment a thermostatic sensor (33) formed of a temperature sensitive bimetal is disposed within the hazard sensor. Such bimetal elements deform once a threshold temperature is reached. As shown, in many embodiments the bimetal element (33) would be disposed in relation to a circuit interrupter (34) (FIG. 3, view A) such that when the threshold temperature is reached the bimetal element would trigger the circuit interrupter (FIG. 3, view B) thereby removing electrical current from the power outlet.

Such a hazard sensing safety interlock power outlet assembly may additionally include any other suitable or desired circuitry or hardware for additional safety or functionality. In particular, the power outlet assembly may optionally include a transmitter (42) for communicating information about the power outlet usage, as well as the activation of the safety interlock to a user. Such a transmitter may be wireless or wired, and use any message and transmission format desired.

Although not shown, in some configurations the one or more hazard sensing safety interlocks could be combined with a current limiting safety interlock, such as, for example, the one described in relation to FIG. 2a, along with a rectifier or transformer capable of conditioning the electrical output to suit the specific purpose.

Movable Power Outlet Assemblies

Although the above discussion has focused on power outlet assemblies without reference to whether the assembly is adapted for installation in either fixed or movable enclosures, in many embodiments the power outlet assemblies are specifically adapted for installation in an enclosure where the power outlet of the power outlet assembly is movable relative to the power source for the enclosure. In such embodiments, flexible and extendable electrical interconnectors are provided such that hazards associated with repeated motion of the power outlet relative to the power source, and extension and contraction of the flexible and extendable electrical interconnectors, particularly within the confined space of the enclosure, namely pinching, cutting, binding, minimal bend radius, tangling, etc. are prevented. Such hazards can cause chaffing, wear and ultimate failure of the flexible electrical connector, in turn giving rise to a short circuit, thus creating a potential fire hazard.

Figure 4:
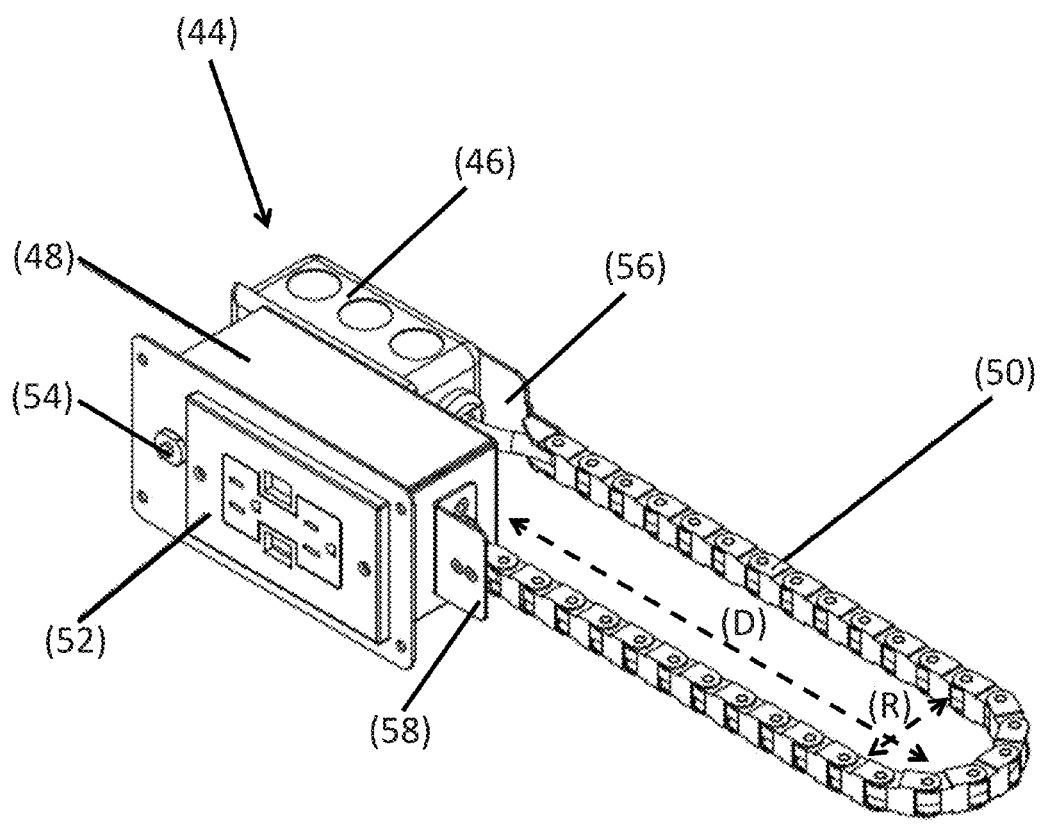
FIG. 4 provides a schematic of a power outlet assembly adapted for installation in movable relation to the power source in accordance with many embodiments of the invention.
Figure 5A:
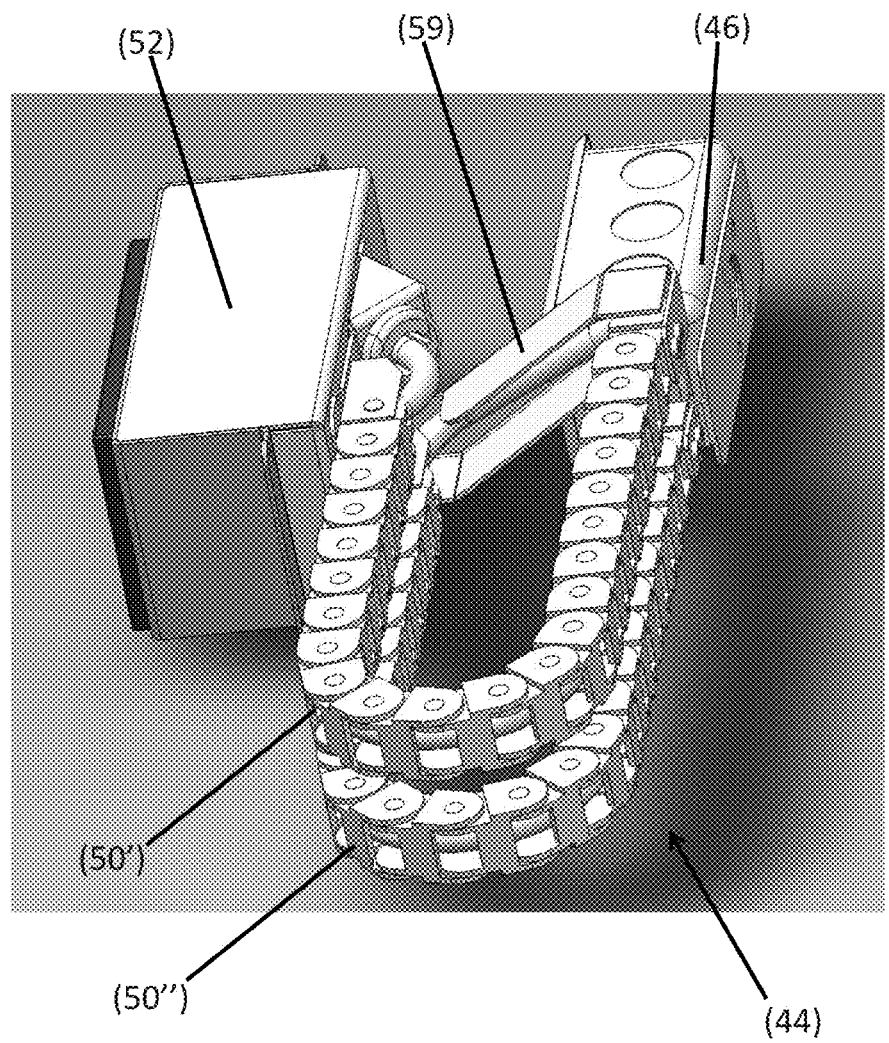
FIGS. 5a to 5d provide schematics of a power outlet assembly adapted for installation in movable relation to the power source in accordance with other embodiments of the invention.
Figure 5B:
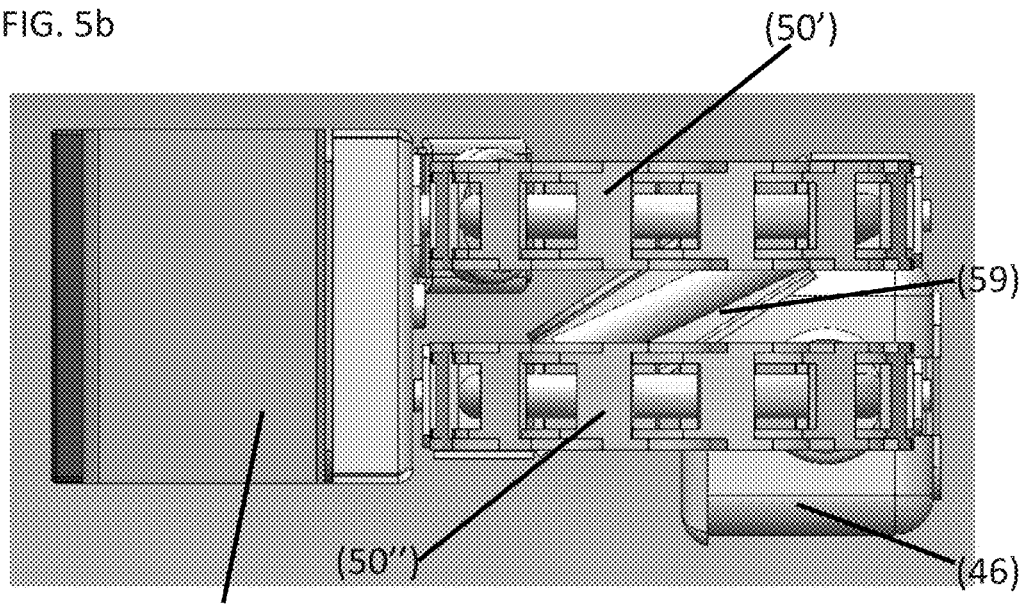
Figure 5C:
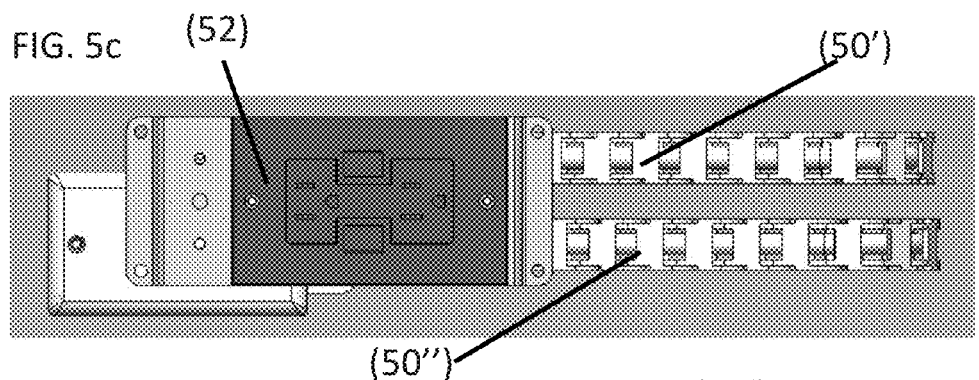
Figure 5D:
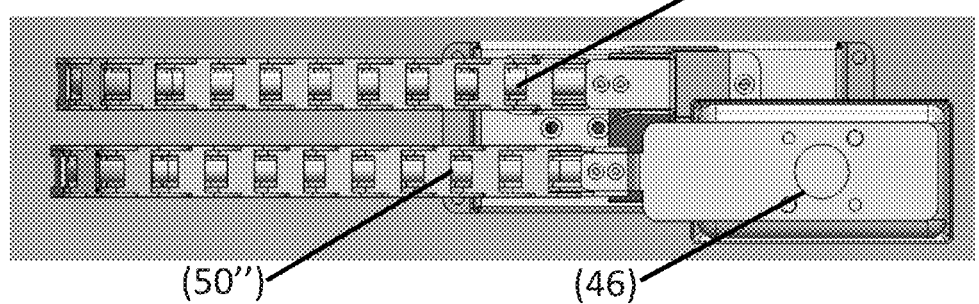

In accordance with embodiments, as shown in FIG. 4, movable power outlets (44) comprise generally a fixed power source (46) where the power from outside an enclosure enters the enclosure, a movable outlet box (48), and a flexible wire conduit interconnected therebetween (50). The fixed junction box (46) and the power outlet (48) may take the form of any suitable/desired power input and output as long as the position of the power source relative to the enclosure is static, i.e., fixed relative to the enclosure; and the position of the power outlet (48) itself is dynamic, i.e., movable relative to the placement of the power source. In particular, as shown in FIG. 4, the power outlet may include any suitable power socket (52), such as, for example, two and three prong power sockets, electronic connectors (such as USB, firewire, thunderbolt, etc.), internet connector, and combinations thereof. As described above, the power outlet may also include a safety interlock, such as, for example, a resettable safety interlock (54), which may be a current limiting safety interlock or a hazard sensing safety interlock, or a combination thereof, for example.

Turning to the flexible electrical interconnector, it should be understood that any structure adapted to provide an extendable and contractable electrical interconnection between the fixed power source and the movable power outlet may be used as long as the flexible electrical interconnector is able to extend/contract and provide an electrical interconnection between the power source and power outlet across the entire travel length of the movable power outlet. In some embodiments, as shown in FIG. 4, the flexible/extendable electrical interconnection (50) comprises an electrically conductive wire disposed within a flexible conduit, the conduit being adapted to at least partially enclose and restrict the motion of the electrically conductive wire to prevent tangling and pinching of the conductive wire. Additionally and alternatively, the flexible conduit may be adapted to ensure that the wire is not bent beyond a specified minimum bend radius (R) at which the wire may undergo damage from overbending or pinching. Such a minimum bend radius is dependent on the gauge and type of conductive wire being used, and may be determined by reference to manufacturer specifications. In the embodiment shown in FIG. 4, the flexible conduit is a flexible cable chain, but it will be understood that other structures may be utilized including spring-loaded cable reels, or other functionally similar structures.

Although the above embodiment depicts a flexible electrical interconnector having an embodiment of a flexible cable chain conduit, it should be understood that alternative embodiments of such conduits of varying shapes, sizes and configurations may be incorporated into the power outlet assemblies. For example, in embodiments incorporating a flexible cable chain conduit, to ensure that the flexible cable chain conduit of the flexible electrical interconnector does not tangle, and yet provides sufficient travel to the drawer both for expansion and contraction, it is necessary to provide a certain lateral distance into which the flexible electrical interconnector can fold (as shown by the arrow 'D' in FIG. 4), and this distance must be long enough to hold the entire length of the conduit. If you want more travel, the conduit has to stick out more and requires a larger portion of the enclosure be designated as storage space for the electrical interconnection, which is not optimal. In the case of the cable chain conduit shown in FIG. 4, in which the conduit makes a single turn, this means that the length of the fold 'D' must be at least half that of the total travel length 'L' of the moving portion of the enclosure, such as, a drawer.

The requirement of the physical distance 'D' required by the flexible electrical interconnector puts a constraint on either the travel of the movable portion of the enclosure, or the size of the enclosure required to contain the flexible electrical interconnection. Accordingly, in many embodiments configurations of flexible electrical interconnectors (50) having more compact designs are provided. In one such embodiment, provided in FIGS. 5*a* to 5*d*, an electrical interconnection (50) is provided, which, rather than having a flexible conduit that simply extends out in a single U shape, has a conduit that is folded into two or more "U-bends" (50' & 50") that are interconnected by one or more pivotable brackets (59) that allow the multiple U-bends to extend into an elongated configuration when the enclosure is extended, and contract into a parallel stacked configuration when the enclosure is contracted. Alternatively, the flexible conduit might be formed into an "S" turn, or other configuration, so long as the flexible conduit may be contained within the space allowed by the enclosure, and such that the conduit is not bent below the minimum bend radius.

Regardless of the specific design of the flexible electrical interconnector, in many embodiments the interconnector should provide sufficient movement between the power source and outlets such that the interconnector is able to maintain the electrical interconnection between the source and outlet without restraining the motion of the relevant movable portion of the enclosure. In addition, the flexible electrical interconnector should, in many embodiments, restrain the uncontrolled motion of the interconnector to prevent tangling, and also prevent overbending of the interconnection (i.e., by bending the wire more sharply than designated by a minimum bend radius) to ensure that the interconnection is not pinched and damaged.

Finally, strain reliefs (56 & 58) may also be incorporated into one or both of the junction box and outlet box where the flexible wire conduit attaches thereto to prevent cutting and chaffing of the wire and wire conduit during movement.

Incorporation of Outlet Assembly Into Movable Enclosure

Figure 6:
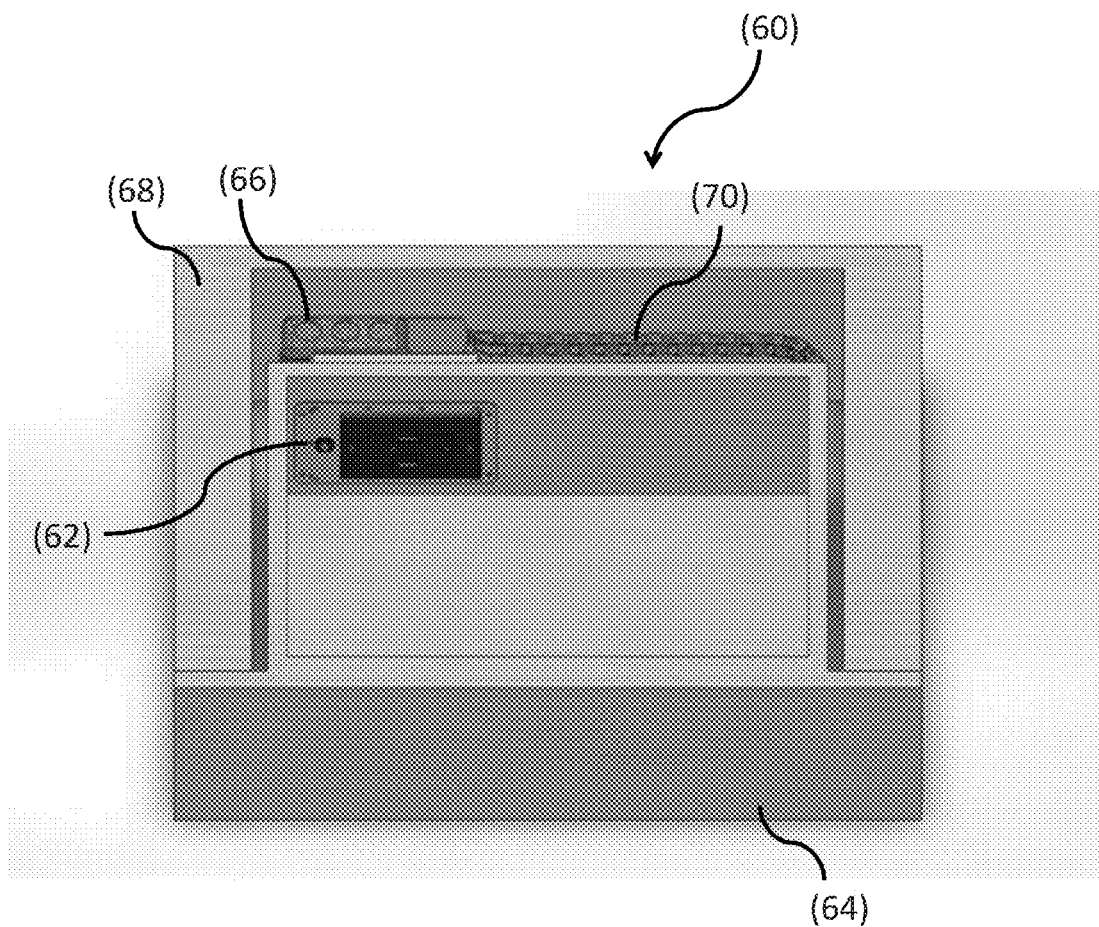
FIG. 6 provides a schematic of a power outlet assembly mounted within a drawer enclosure in accordance with many embodiments of the invention.

In many embodiments, the power outlet assembly is incorporated into a movable portion of an enclosure (60). An exemplary embodiment of a movable outlet (62) integrated into an enclosed drawer (64) is shown schematically in FIG. 6. In such an embodiment, the power outlet assembly includes a power source (66) that would be attached to one of the fixed portions (68) of the drawer unit (60). The power outlet (62) would then be incorporated into a portion of the movable portion of the enclosures (in this example a slidable drawer (64) of the enclosure). In many embodiments, as shown in FIG. 6, the outlet box (62) would be positioned at the rear of the enclosure, such that it would only be accessible when the movable portion of the enclosure is in an extended or open position, although other arrangements can also be contemplated, as will be described in greater detail below. The flexible/extendable electrical interconnection (70) is then interconnected between the fixed power source and the movable power outlet, and provided with sufficient flexibility and travel such that the electrical interconnection is maintained between the source and outlet across the entire length of the movable enclosure's motion. As discussed above, this flexible/extendable electrical interconnection may include a flexible wire conduit, such as, for example, a flexible chain conduit, or functional equivalent, as shown in FIG. 4 or 5. An embodiment of an enclosure (72) incorporating a stacked chain conduit (74) such that an outlet (76) is disposed at the rear of a drawer (78) of the enclosure is shown in FIG. 7.

Figure 7:
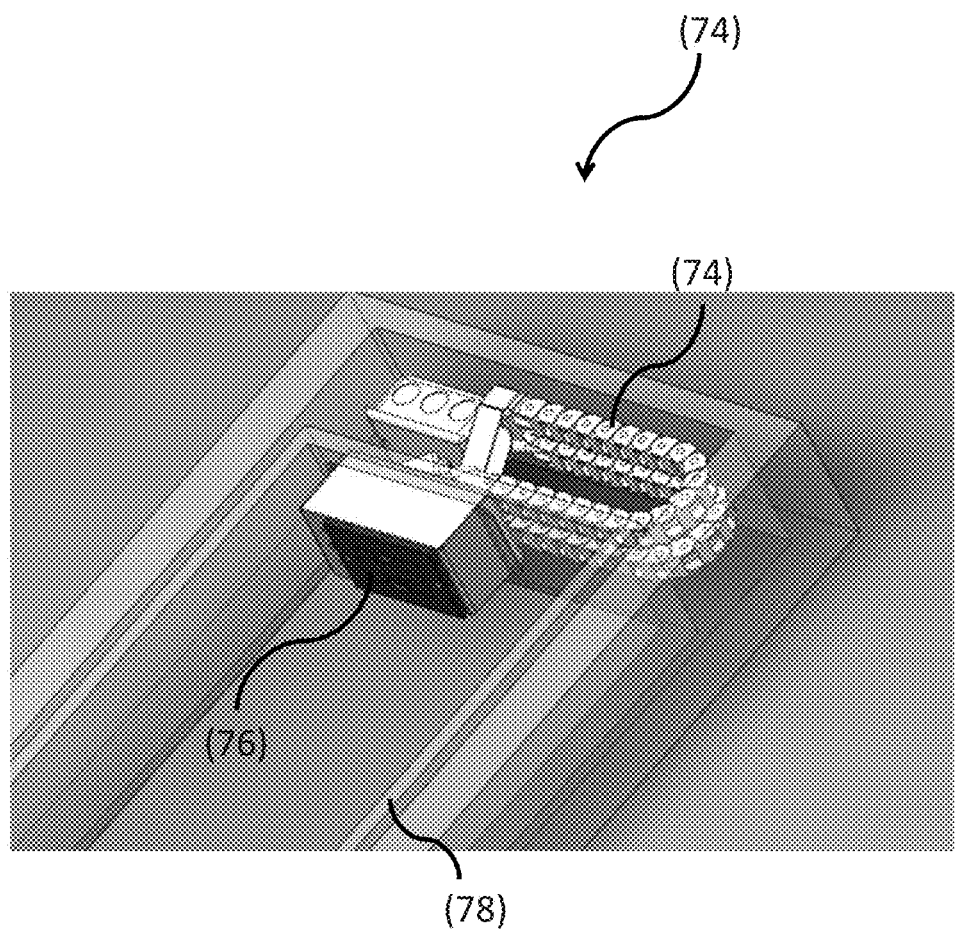
FIG. 7 provides a schematic of a power outlet assembly mounted within a drawer enclosure in accordance with other embodiments of the invention.

The embodiments of FIGS. 6 and 7 provide examples of power outlet assemblies installed in the rear of drawer enclosures, however, it will be understood that other configurations may be formed within the limits of the disclosure. For example, in many embodiments the power outlets are adapted to be installed on the sides of a drawer enclosure. In such an embodiment the power outlet, would be installed in the side of the drawer, the power supply would be installed either in the side or rear of the enclosure, and then the flexible electrical interconnector would pass within the space along at least the side of the drawer.

Figure 8:
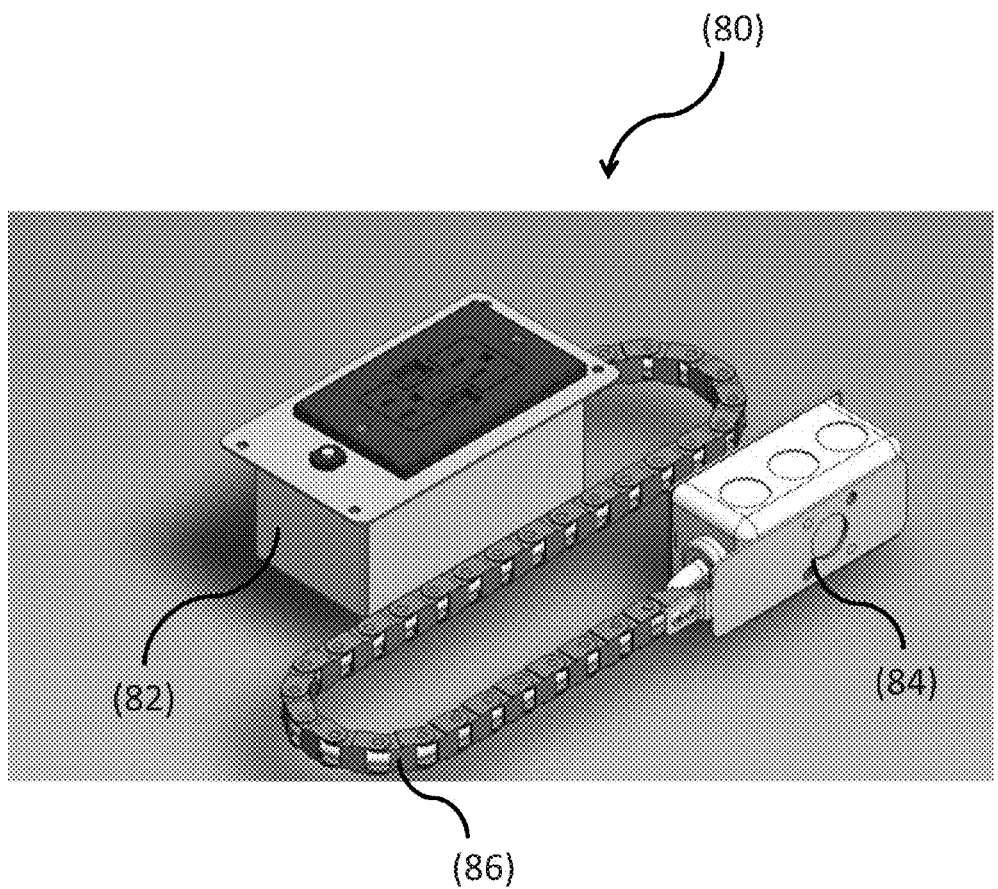
FIG. 8 provides a schematic of a power outlet assembly oriented horizontally in accordance with embodiments of the invention.

Although the embodiments provided in FIGS. 6 and 7 provide an electrical power outlet adapted for installation in an enclosure such that the outlet has a vertical orientation, it should be understood that other adaptations and orientations might be provided. FIG. 8 provides a schematic of a power outlet assembly (80) adapted such that the power outlet (82) has a horizontal orientation. Although not shown, such an embodiment could be installed in the base or bottom of the movable part of an enclosure, such as in the bottom of a drawer. As shown, in such an embodiment, the power source (84) and the flexible electrical interconnection (86) may be disposed such that the flexible electrical interconnection passes near the bottom of the power outlet. Using such a configuration, the flexible electrical interconnection could be arranged such that the flexible electrical interconnection passes under the bottom of the enclosure, such as underneath the bottom of a drawer. In such an embodiment, the flexible electrical interconnection might be formed into a U-bend, a stacked U-bend, or as shown, an S-bend. Regardless of the specific configuration the flexible electrical interconnection should be compact enough to fit within the allowable space, but with no overbending, that is that does not bend at an angle below a minimum bending radius.

Finally, although a single type of movable enclosure, incorporating a drawer is provided in FIG. 5, it should be understood that this is only provided as an example. Other movable structures may be provided and the power outlet assemblies incorporated therein, including, for example, hinged cabinets and doors, furniture, benches and worktops, vanities, etc.

Doctrine of Equivalents

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A power outlet assembly for an enclosure comprising:
   at least one power outlet electrically interconnectable with at least one electrical device;
   at least one junction box electrically interconnected to said at least one power outlet for providing a source of electrical energy to said power outlet, wherein the power outlet is movable within a defined range relative to said junction box along a predefined path at least between a first position where the power outlet is distal to the junction box and a second position where the power outlet is proximal to the junction box;
   a flexible electrical interconnector in a conductive relation between the junction box and power outlet, said flexible electrical interconnector adapted to provide a continuous electrical interconnection between the junction box and power outlet without restricting the range of motion of the power outlet relative to the junction box within said defined range such that continuous power is supplied from the junction box to the power outlet independent of the relative positions of the junction box and power outlet;
   at least one safety interlock having at least one sensor capable of detecting at least one hazardous condition within the environment of said enclosure, the at least one safety interlock being adapted to interrupt the flow of electrical current between the at least one power source and the at least one power outlet upon detection of one or more of the at least one hazardous conditions;
   at least one safety interlock switch configured to activate the operation of the at least one safety interlock when the power outlet is in the second position and deactivate the at least one safety interlock when the power outlet is in the first position; and
   wherein the at least one power outlet is accessible to the at least one electrical device along the entire defined range of the predefined path.

2. The power outlet assembly of claim 1 wherein the at least one sensor is selected from the group consisting of a smoke detector, heat detector, and toxic gas monitor.

3. The power outlet assembly of claim 2, wherein the heat detector comprises a thermostat.

4. The power outlet assembly of claim 1, wherein the power outlet assembly comprises at least two safety interlocks.

5. The power outlet assembly of claim 1, further comprising a current limiting safety interlock adapted to prevent the flow of current above a specified amperage from the power source to the power outlet.

6. The power outlet assembly of claim 1, further comprising a rectifier in electrical connection with the power source and adapted to convert the incoming electrical current from AC to DC.

7. The power outlet assembly of claim 1, further comprising a transmitter in signal communication with the at least one safety interlock for communicating the status of the power outlet assembly to a user.

8. The power outlet assembly of claim 7, wherein the transmitter is configured to automatically transmit upon activation of any one of the at least one safety interlocks.

9. The power outlet assembly of claim 1, wherein the junction box is in a fixed position and the power outlet is movable relative to said power source.

10. The power outlet assembly of claim 1, wherein the flexible electrical interconnector is at least partially disposed within a flexible conduit adapted to confine the flexible connector within a separate predefined connector path and configured such that the bend radius of the flexible electrical interconnector is prevented from being bent below a specified minimum bend radius.

11. The power outlet assembly of claim 10, wherein the flexible electrical interconnector is fully enclosed within the flexible conduit.

12. The power outlet assembly of claim 10, wherein the flexible conduit comprises a flexible chain conduit comprised of a plurality of movable links that collectively define an internal channel within which the flexible electrical interconnector is disposed, the links being adapted to confine the flexible connector within a separate predefined connector path and configured to prevent the flexible interconnector from being bent below a minimum bend radius.

13. The power outlet assembly of claim 12, wherein the flexible electrical interconnector and flexible chain conduit are configured such that when the power outlet is proximal to the junction box along the predefined path, the flexible electrical interconnector and the chain conduit are bent into a configuration selected from the group consisting of:
   a single U-shape having a first end interconnected with the junction box and a second end interconnected with the power outlet and having a bend radius at least equal to the specified minimum bend radius, and wherein the U-shape has a folded length approximately half the length of the defined range of motion of the power outlet;
   at least two U-shapes disposed relative to each other in a parallel stacked configuration, wherein a first end of a first of the at least two U-shapes is interconnected with the junction box, a second end of a second of the at least two U-shapes is interconnected with the power outlet, and a second end of the first of the at least two U-shapes and a first end of the second of the at least two U-shapes are interconnected with a pivotable connector configured to maintain the distance between the armatures of the U-shapes such that the flexible electrical interconnector has a bend radius at least equal to the specified minimum bend radius, and wherein the at least two U-shapes have, in combination, a folded length approximately half the length of the defined range of motion of the power outlet; and
   an S-shape, having a first end interconnected with the junction box and a second end interconnected with the power outlet, and forming at least two bends each having a bend radius that is at least equal to the specified minimum bend radius.

14. A power equipped enclosure comprising:
an enclosure defining an internal volume, said internal volume being accessible;
at least one power outlet disposed within the internal volume of the enclosure outlet, the at least one power outlet being electrically interconnectable with at least one electrical device;
at least one junction box electrically interconnected to said at least one power outlet for providing a source of electrical energy to said power outlet, wherein the power outlet is movable within a defined range relative to said junction box along a predefined path at least between a first position where the power outlet is distal to the junction box and a second position where the power outlet is proximal to the junction box;
a flexible electrical interconnector in a conductive relation between the junction box and power outlet, said flexible electrical interconnector adapted to provide a continuous electrical interconnection between the junction box and power outlet without restricting the range of motion of the power outlet relative to the junction box within said defined range such that continuous power is supplied from the junction box to the power outlet independent of the relative positions of the junction box and power outlet;
at least one safety interlock having at least one sensor disposed within the enclosure and capable of detecting at least one hazardous condition within the environment of said enclosure, the at least one safety interlock being adapted to interrupt the flow of electrical current between the at least one power source and the at least one power outlet upon detection of one or more of the at least one hazardous condition;
at least one safety interlock switch configured to activate the operation of the at least one safety interlock when the power outlet is in the second position and deactivate the at least one safety interlock when the power outlet is in the first position; and
wherein the at least one power outlet is accessible to the at least one electrical device along the entire defined range of the predefined path.

15. The power equipped enclosure of claim 14, wherein the at least one sensor is selected from the group consisting of a smoke detector, heat detector, and toxic gas monitor.

16. The power equipped enclosure of claim 15, wherein the heat detector comprises a thermostat.

17. The power equipped enclosure of claim 14, wherein the power outlet assembly comprises at least two safety interlocks.

18. The power equipped enclosure of claim 14, further comprising a current limiting safety interlock adapted to prevent the flow of current above a specified amperage from the junction box to the power outlet.

19. The power equipped enclosure of claim 14, further comprising a rectifier in electrical connection with the power source and adapted to convert the incoming electrical current from AC to DC.

20. The power equipped enclosure of claim 14, further comprising a transmitter in signal communication with the at least one safety interlock for communicating the status of the power outlet assembly to a user.

21. The power equipped enclosure of claim 20, wherein the transmitter is configured to automatically transmit upon activation of any one of the at least one safety interlocks.

22. The power equipped enclosure of claim 14, wherein the enclosure includes at least one movable element, and wherein the junction box and power outlet are arranged such that the movement of the at least one movable element moves the power outlet relative to the junction box.

23. The power equipped enclosure of claim 22, wherein the movable element is a drawer.

24. The power equipped enclosure of claim 22, wherein the power outlet has an orientation selected from one of either disposed vertically in the side of the drawer, or disposed horizontally in the bottom of the drawer.

25. The power equipped enclosure of claim 14, wherein the flexible electrical interconnector is at least partially disposed within a flexible conduit adapted to confine the flexible connector within a separate predefined connector path and configured such that the bend radius of the flexible electrical interconnector is prevented from being bent below a specified minimum bend radius.

26. The power equipped enclosure of claim 25, wherein the flexible electrical interconnector is fully enclosed within the flexible conduit.

27. The power equipped enclosure of claim 25, wherein the flexible conduit comprises a flexible chain conduit comprised of a plurality of movable links that collectively define an internal channel within which the flexible electrical interconnector is disposed, the links being adapted to confine the flexible connector within along a separate predefined connector path and configured to prevent the flexible interconnector from being bent below a minimum bend radius.

28. The power equipped enclosure of claim 27, wherein the flexible electrical interconnector and flexible chain conduit are configured such that when the power outlet is proximal to the junction box along the predefined path, the flexible electrical interconnector and the chain conduit are bent into a configuration selected from the group consisting of:
a single U-shape having a first end interconnected with the junction box and a second end interconnected with the power outlet and having a bend radius at least equal to the specified minimum bend radius, and wherein the U-shape has a folded length approximately half the length of the defined range of motion of the power outlet;
at least two U-shapes disposed relative to each other in a parallel stacked configuration, wherein a first end of a first of the at least two U-shapes is interconnected with the junction box, a second end of a second of the at least two U-shapes is interconnected with the power outlet, and a second end of the first of the at least two U-shapes and a first end of the second of the at least two U-shapes are interconnected with a pivotable connector configured to maintain the distance between the armatures of the U-shapes such that the flexible electrical interconnector has a bend radius at least equal to the specified minimum bend radius, and wherein the at least two U-shapes have, in combination, a folded length approximately half the length of the defined range of motion of the power outlet; and
an S-shape, having a first end interconnected with the junction box and a second end interconnected with the power outlet, and forming at least two bends each having a bend radius that is at least equal to the specified minimum bend radius.

* * * * *